United States Patent [19]

Pinney

[11] 4,076,464
[45] Feb. 28, 1978

[54] DUAL WAVE MOTION PUMP

[76] Inventor: Paul E. Pinney, 48 Linden Ave., Lincoln Park, N.J. 07035

[21] Appl. No.: 761,740

[22] Filed: Jan. 24, 1977

[51] Int. Cl.$^2$ ............................................. F04B 17/00
[52] U.S. Cl. .................................... 417/332; 417/543
[58] Field of Search ............... 417/331, 332, 333, 533, 417/543; 60/506, 500

[56] References Cited

U.S. PATENT DOCUMENTS

| | | | |
|---|---|---|---|
| 3,010 | 3/1843 | Higbie | 417/533 |
| 541,631 | 6/1895 | Rusling | 417/332 |
| 582,282 | 5/1897 | Greiner | 417/332 |
| 632,836 | 9/1899 | Rice | 417/332 |
| 882,883 | 3/1908 | Hillson | 60/500 |
| 1,078,323 | 11/1913 | Trull | 417/332 |
| 3,487,228 | 12/1969 | Kriegel | 417/331 |

*Primary Examiner*—Carlton R. Croyle
*Assistant Examiner*—Richard E. Gluck
*Attorney, Agent, or Firm*—James J. Cannon, Jr.; James J. Cannon

[57] ABSTRACT

An apparatus for the conversion of complex surface motion of the sea or other fluid body into useful energy, comprising a pair of floating bodies, each of which constitutes a wave motion pump; the pair of floating bodies being linked by a lever whose motion serves to initiate and multiply the pumping energy of each. Each floating body contains two piston operated water cylinders with water intake check valves at their bases and a third cylinder serving as a pressure chamber. Each floating body contains its own fulcrum such that it rocks about one end of the lever. The downward pivotal motion of the lever on the piston shaft of the piston in one of said water cylinders forces water out of the cylinder. Simultaneously, the upward motion of the lever on the other side of the fulcrum pulse the piston shaft of the other piston upward, causing water to be taken into the other cylinder through the intake check valve at its base. As the action of the lever reverses, the action of the pistons reverses, causing a constant flow of water under pressure into the pressure chamber from which it exhausts. The same sequence of events occurs in the second floating body, thus causing the effect of a dual pump. Air pressure is utilized to reinforce this process. Since the apparatus has four cylinders alternately and sequentially forcing water through defined channels, the effect of an efficient pump is created, which might be utilized for any normal purpose.

2 Claims, 5 Drawing Figures

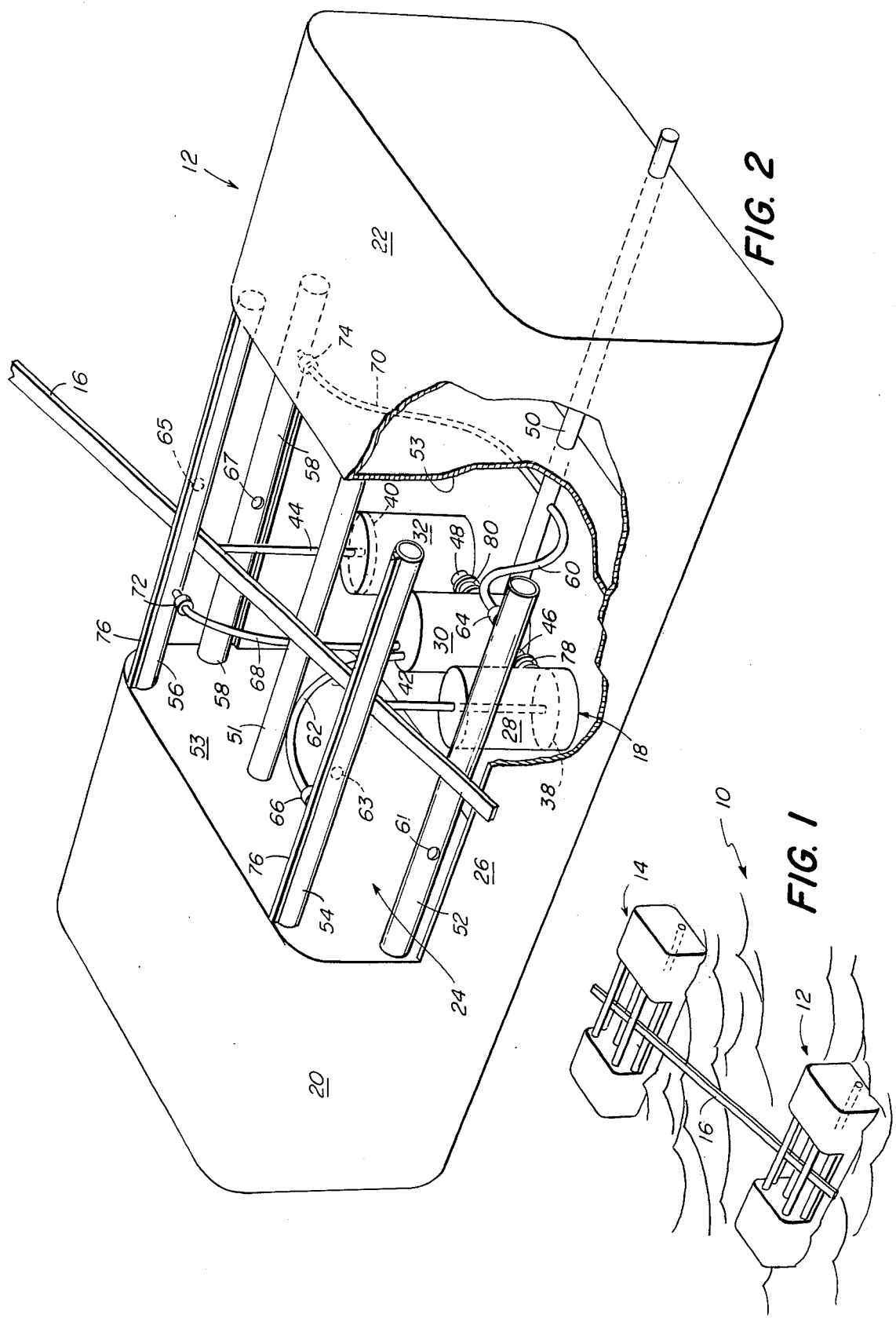

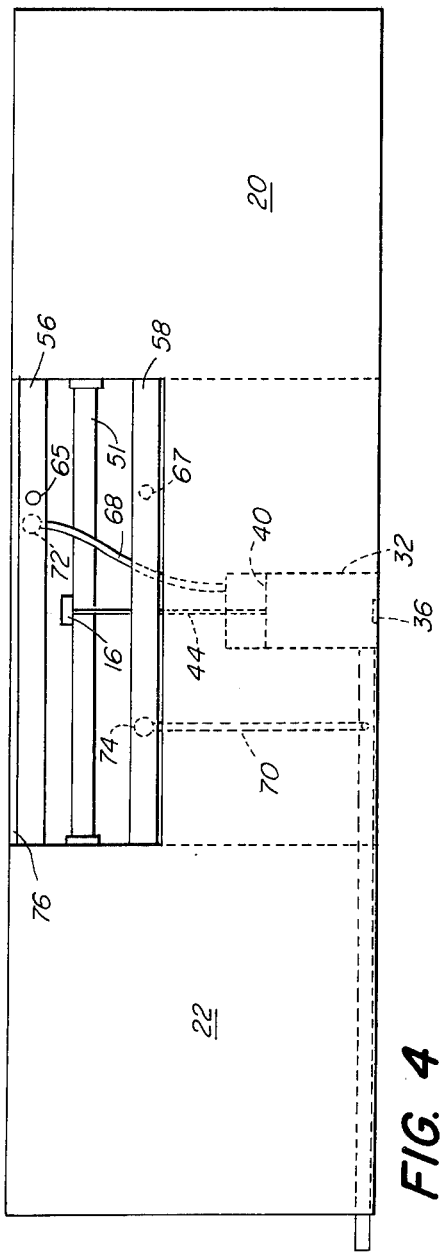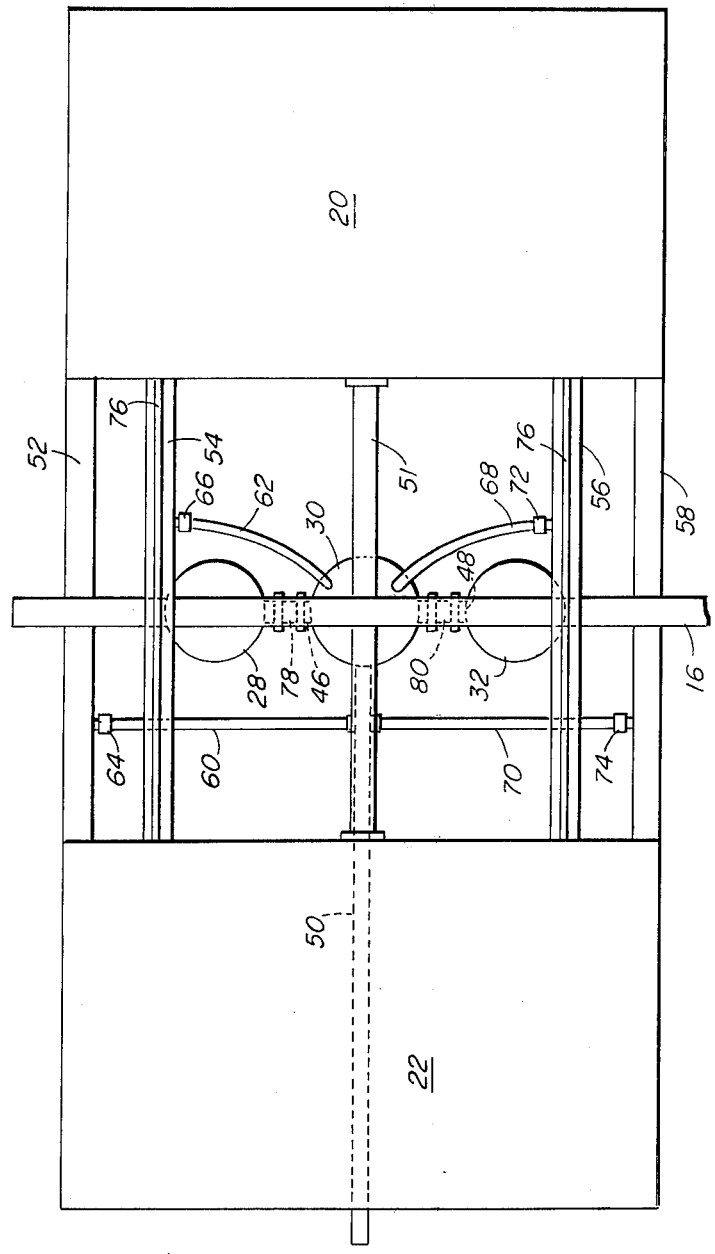

DUAL WAVE MOTION PUMP

BACKGROUND OF THE INVENTION

1. Field of the Invention

This invention pertains to wave motion pumps, namely, to an apparatus which converts the energy of waves and surface currents to a useful form of energy through a leveraged fluidic pumping mechanism.

2. Description of the Prior Art

The prior art in wave motion devices is both old and new. Basically it reflects attempts to develop efficient forms of energy at times when alternate sources of energy are economically or technologically lacking. Among the devices taught in the older patent art are wave motors described in U.S. Pat. Nos. 997,731 and 937,712. Each of the wave motors therein described is relatively inefficient by present day standards.

U.S. Pat. No. 997,731 teaches a wave motor which relies on tension created between a floatable body and a submerged body suspedned from the floatable body. Since the device is relying on line tension between two bodies, its efficiency in converting the energy of wave motion to usable power is not very high.

U.S. Pat. No. 937,712 teaches the conversion of wave motion into rotary motion. The conversion of motion from one state to another is inherently inefficient and the techniques described therein disclose no way of minimizing this inefficiency.

In the recent patent art, U.S. Pat. No. 3,307,827 describes a wave power converter which supplies electrical energy to an unattended buoy. This is a special purpose device of limited applicability. U.S. Pat. Nos. 3,918,827 and 3,934,964 each teach complex devices which cannot be cost-efficient in the conversion of wave motion to energy.

U.S. Pat. No. 3,961,863 describes an apparatus wherein complex multiplanar surface motion of a fluid body is converted into useful energy. This is the most sophisticated prior art device known to the inventor. This apparatus used a flexible, tubular pumping element supported by floats and a flexible truss structure which provides a lever-type action to provide a mechanical advantage. The device of the present invention utilizes similar principles in a simpler structure.

In general, various attempts at wave power conversion have been made in the past to convert the energy of wave motion to another form of energy, but these attempts have met with little success. Prior devices for wave energy conversion have generally been directed to utilizing wave surface motion only as a source of power supply, neglecting other forces present. They have also utilized very inefficient means of energy conversion. The use of surface motion only has generally proved disasterous in that the extremely destructive conditions of wind and waves existing on the ocean surface require unusual structural capabilities for the device. The use of surface motion only for wave power conversion therefore generally results in an unreliable device. Prior art devices also suffer from an excessive cost of construction relative to the amount of useful energy generated therefrom.

Wave motion conversion devices of the future must have three principal design criteria in view. First, they must take into consideration all forces present in the complex multiplanar surface motion of a fluid body. Second, they must provide for an efficient conversion of captured energy. Third, they must provide for a competitive cost per unit output of energy with other sources of energy. In other words, the wave motion device must be a relatively simple and cost-effective device. The principal object of the present invention is to meet these criteria.

Another object of the present invention is to provide a new apparatus for the efficient conversion of fluid motion at or near the surface into usable energy.

Still another object of the invention is to provide an apparatus for conversion of the surface motion of a fluid body into usable energy with a pump that is activated by forces at or near the fluid surface.

These and other objects of the invention which will be apparent as the description proceeds are accomplished by the wave motion pump described herein.

SUMMARY OF THE INVENTION

In the apparatus of the present invention, wherein the movements of the sea or other fluid body at or near the surface are converted into useful energy, two parallel disposed pumping units are utilized in conjunction with one another, the two units being connected by a lever. Each pumping unit comprises a floating hull having two flotation chambers, one at each end and the operative pumping mechanism centrally disposed therebetween. Each pumping unit comprises three interconnected cylinders disposed along the lateral axis of the hull, the central cylinder being located at the intersection of the lateral and longitudinal axes. Each of the two end cylinders has an intake water check valve to permit water to enter each cylinder from beneath the hull. Each of said end cylinders is in lateral communication with the central cylinder through pipes with check valves near the base of the cylinders so that water may flow from both end cylinders to the central cylinder. The central cylinder has an exhaust check valve through which water taken in through the end cylinders is exhausted. Each end cylinder has a piston therein which is pushed downward and pulled upward by the pivotal motion of the lever as each pumping unit pivots about one end of this lever. This causes the end cylinders in each pumping unit to be filled and exhausted with water alternately, the exhausted water being forced into the pressure chamber and then out the exhaust pipe. Extending longitudinally between the forward and aft flotation compartments of the hull and along the longitudinal axis thereof is a rigid shaft which serves as a fulcrum for a lever. Similarly extending longitudinally between the forward and aft flotation compartments of the hull are a pair of flexible air bumpers along each side of the hull to restrict the movement of a laterally extending lever which runs along the lateral axis of the hull over the three cylinders. The two end cylinders have vertical shafts extending upward from their pistons to the lever. As the lever pivots about the fulcrum, one piston is pushed downward and the other is pulled upward. This reciprocating action causes a continuous flow of water into the pressure chamber or central cylinder from which the water exhausts through the exhaust pipe.

The upper two of said air bumpers are connected by an air hose to the central cylinder which serves as a pressure chamber. As one or the other bumper is pushed by the lever air is forced out of the bumper into the pressure chamber to increase the pressure therein to exhaust the water. The lower two bumpers are connected by air hoses to the exhaust line of the pressure chamber to serve the same purpose. Each air bumper has an air intake check valve to permit it to be refilled with air as the pressure of the lever is released. Thus, as each hull rocks in water the dual reciprocal pistons, aided by mechanical pressure of the lever and the air pressure caused by the lever exerting pressure on the air bumpers, there is a constant pressurized flow of water into the pressure chamber and out of the exhaust pipe. The power is derived from the alternating difference between the buoyancy of one null and the weight of the other. As one hull rides the crest of a wave the other would be in its trough. Thus the dual hulls create a dual wave motion pump of very high efficiency.

BRIEF DESCRIPTION OF THE DRAWINGS

FIG. 1 is a perspective view of the dual wave motion pump of the present invention.

FIG. 2 is a partially cut-away perspective view of one hull pump of the device of FIG. 1.

FIG. 4 is a side view of the hull of FIG. 2.

FIG. 5 is a top view of the hull pump unit of FIG. 2.

DESCRIPTION OF THE PREFERRED EMBODIMENT

Figure 3:
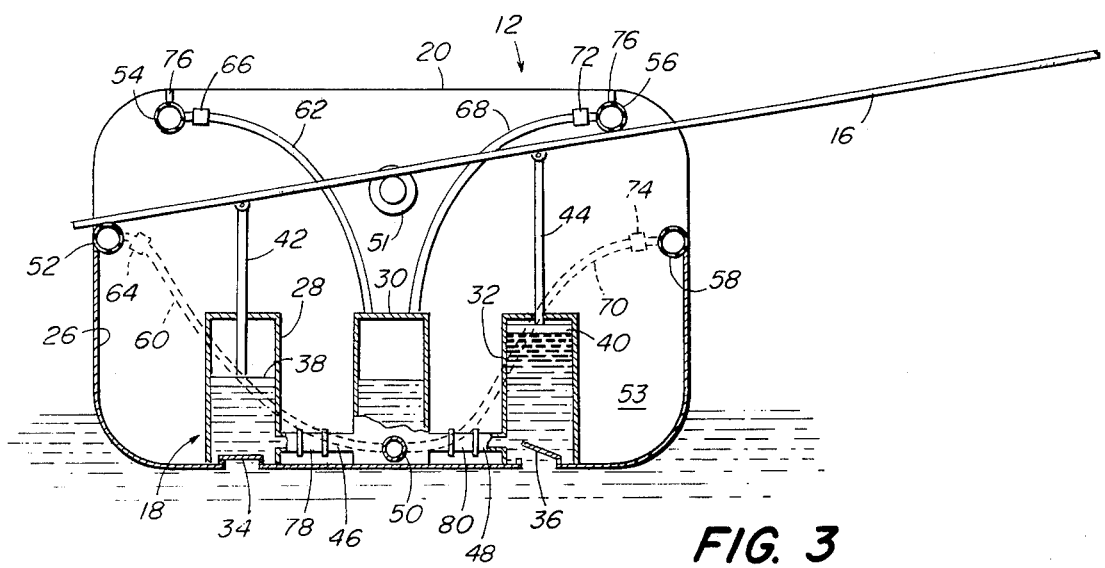
FIG. 3 is a cross-sectional view of one hull pump taken along the line 3 — 3 of FIG. 2.

Referring now to the drawings, FIG. 1 is a perspective view of the dual wave motion pump 10 of the present invention showing identical dual hulls 12, 14, each of which contains a wave motion pump, connected by a common lever 16, as will be described in detail hereinafter. Since hulls 12, 14 are identical in construction and operation, only one will be described herein.

FIG. 2 is a perspective view of hull 12 with a wave motion pump installed therein. Hull 12 has two enclosed end compartments, forward compartment 20 and aft compartment 22 which serve as flotation compartments. A central, open compartment 24 is between the two flotation compartments 20, 22, the sidewalls 26 of hull 12 rising about half the height of central compartment 24.

The wave motion pump installed in central compartment 24 consists of three cylinders 28, 30, 32 disposed along the lateral axis of central compartment 24. Left cylinder 28 and right cylinder 32 are secured into the bottom of hull 12 and each has a water intake check valve 34, 36 extending through the bottom of hull to permit the intake of water into each Of cylinders 28, 32. Cylinders 28, 32 have pistons 38, 40 respectively with vertical shafts 42, 44 respectively. Cylinders 28, 32 are in fluid commmunication with central cylinder 30, which serves as a pressure chamber, through pipes 46, 48 respectively, positioned near the base of each cylinder 28, 30, 32. As pistons 38, 40 are forced downwards alternately in cylinders 28, 32, the water in said cylinders is forced into central pressure chamber 30. An exhaust pipe 50 leads from near the base of pressure chamber 30 through aft flotation compartment 22 to exit at the aft end of hull 12.

Lever 16 serves to drive pistons 38, 40 up and down. A longitudinal rigid bar 51 extending between interior walls 53 of central compartment 24 serves as a fulcrum for lever 16. The upward and downward movement of lever 16 restricted by two pairs of air bumpers 52, 54, 56, 58 extending longitudinally parallel to and above the sidewalls 26 of hull 12 and between interior walls 53 of flotation compartments 20, 22. Air bumpers 54, 56 are connected to pressure chamber 30 by air hoses 62, 68 each of which has a check valve 66, 72 respectively. Air bumpers 52, 58 are connected to exhaust pipe 50 by air hoses 60, 70, each of which has a check valve 64, 74. Each air bumper 52, 54, 56, 58 also has an air intake check valve 61, 63, 65, 67 respectively. As one or the other end of lever 16 exerts pressure on an air bumper, air is forced out through the respective air hose. As the lever 16 releases pressure on a bumper, its respective air intake check valve permits it to be refilled. Shafts 42, 44 of pistons 38, 40 are connected to lever 16. As one end of lever 16 pivots downward it will push shaft 42 of piston 38 downward, forcing water out of cylinder 28 through pipe 48 into pressure chamber 30 and out exhaust pipe 50. The downward movement of lever 16 is stopped by air bumper 52. As lever 16 exerts pressure on air bumper 52, air is forced through hose 60 to exhaust pipe 50 to maintain pressure on the water flowing therethrough. Simultaneously, the other end of lever 16, is pivoting upward, pulling shaft 44 of piston 40 upward, permitting the intake of water into cylinder 32. As this end of lever 16 hits bumper 56, air is forced through hose 68 into pressure chamber 30 to add air pressure to force water out of pressure chamber 30 through exhaust pipe 50. As the ends of lever 16 hit air bumpers 52, 56, the pivotal motion of lever 16 is reversed. As lever 16 ceases to exert pressure on these bumpers 52, 56, air intake check valves 61, 65 permit an inflow of air to restore air pressure in bumpers 52, 56 respectively. The continuous pivotal motion of lever 16 causes a reciprocal action of pistons 40, 42 in cylinders 28, 32, exerting continuous pressure on the water in pressure chamber 30. As pistons 40, 42 pause to reverse their motion, air pressure is supplied to both pressure chamber 30 and exhaust pipe 50. Thus, a constant pressure is maintained in pressure chamber 30 and exhaust pipe 50. As mentioned previously, each air hose contains a check valve to prevent a reverse flow of air.

A dual wave motion pump is obtained by using an elongated lever 16 to connect two hulls 12, 14 as shown on FIG. 1. A central fulcrum, not shown, would be utilized, the exact embodiment of said fulcrum being determined by the use to which the dual wave motion pump of the present invention is put. With the dual pump 10 of FIG. 1 means for utilization of the pressurized flow of water from exhaust pipes 50 must be installed.

FIG. 3 is a cross-sectional view tkaen along the line 3 — 3 of FIG. 2. This view shows the relative positions of air bumpers 52, 54, 56, 58; fulcrum shaft 51; lever 16; air hoses 60, 62, 68, 70; air intake check valves 61, 63, 65, 67; the relative positions of cylinders 28, 30, 32; pipes 46, 48; pistons 38, 40; piston shafts 42, 44, water instake check valves 34, 36; and exhaust pipe 50.

FIG. 4 is a side view showing the relative positions of flotation compartments 20, 22, central compartments 24, air bumpers 56, 58 and fulcrum bar 51. FIG. 4 also shows reinforcing backers 76 which fit above air bumpers 54, 56 to inhibit the upward motion of lever 16. The downward motion of lever 16 is inhibited by the top of hull side 26.

FIG. 5 is a top view of hull 12 showing the relative positions of pipes 46, 48 connecting cylinders 28, 30 and 32 and the check valves 78, 80 within pipes 46, 48 respectively.

When dual wave motion pump 10 is utilized at sea, there is a continuous flow of water under pressure out of each of its exhaust pipes 50. The pressure is maintained by the flow of air pressure when the pivotal motion of lever 16 momentarily stops to reverse itself a third hull unit may be placed between the two units shown and described, thus serving as a central fulcrum for lever 16.

In this disclosure there is shown and described only the preferred embodiment of the invention. It is to be understood that the invention is capable of use in various other combinations and environments, and is capable of changes or modifications within the scope of the inventive concept as expressed herein.

I claim:

1. A dual wave motion pump for converting the wave motion of a fluid body into usable energy comprising:
   at least two hull structures connected together by means of a lever;
   each of said hull structures having at least one enclosed flotation compartment and a partially open pump compartment;
   each of said hull structures supporting a lever-activated pumping means in said pump compartment responsive to wave motion;
   said pumping means comprising:
   a pair of spaced apart cylinders, each of said cylinders having a fluid intake check valve at its base, an outlet means and a reciprocating piston with an elongated shaft operably connected to said lever;
   a fulcrum for said lever located between said piston shafts;
   a pressure chamber between said cylinders in fluid communication with the outlet means of both of said cylinders through pipe means having check valves therein; and
   outlet pipe means from said pressure chamber whereby fluid is delivered to a load;
   each end of said lever being pivotally connected to the pump compartment of one said hulls, including means for limiting the upward and downward pivotal motion of said lever, thereby converting the natural wave motion of a fluid body into leverage forces for activating said pumping means;
   said pumping means further comprising:
   two pairs of longitudinally disposed air bumpers, one pair on each side of said fulcrum, each of said air bumpers having a stiff backing to limit the upward and downward pivotal motion of said lever;
   each of said air bumpers having an air intake check valve;
   an air hose having check valve therein connecting each of the upper air bumpers to said pressure chamber such that when one end of said lever impacts an upper air bumper, air is forced out of said upper air bumper and into said pressure chamber;
   an air hose having a check valve therein connecting each of the lower air bumpers to said fluid outlet pipe means of said pressure chamber such that when one of said lever impacts a lower air bumper, air is forced out of said lower air bumper and into said outlet pipe means;
   means for transferring the pumped fluid from said pumping means to a load;

2. The dual wave motion pump of claim 1 wherein each of said hulls further includes:
   two enclosed flotation compartments, one serving as the fore end of said hull and one serving as the aft end of said hull;
   said open pumping compartment being positioned between said flotation compartments.

* * * * *